United States Patent Office 2,753,862
Patented July 10, 1956

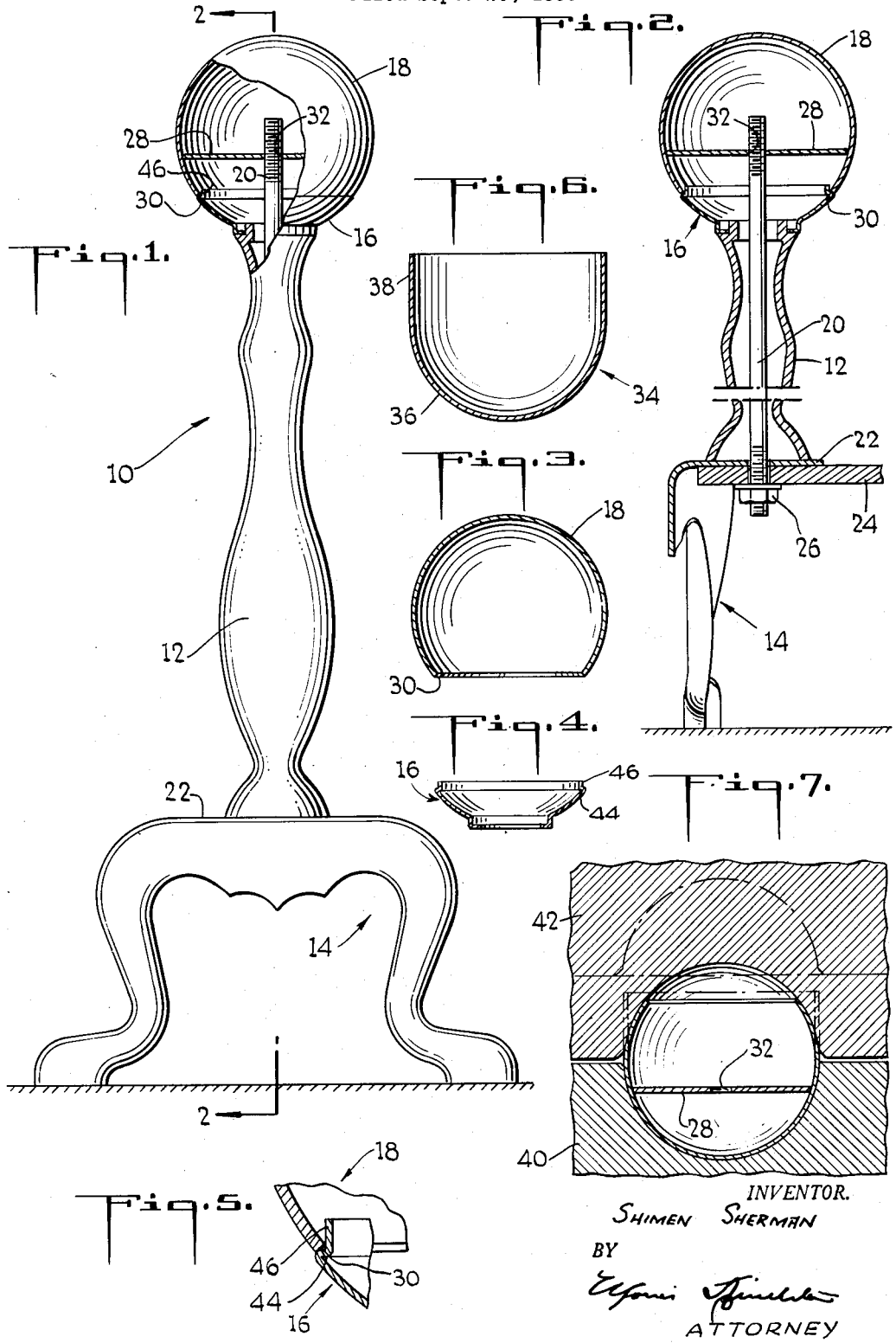

2,753,862

ANDIRON TERMINAL OBJECT AND METHOD FOR CONSTRUCTION OF SAME

Shimen Sherman, New York, N. Y., assignor, by mesne assignments, to Amsco Sales Corp., Brooklyn, N. Y.

Application September 26, 1950, Serial No. 186,701

3 Claims. (Cl. 126—298)

This invention pertains to andirons. More particularly it relates to an improved ornamental top terminal object for an andiron.

Hitherto, andiron tops have been cast or machined from solid metal. There are, however, many disadvantages to this mode of manufacture. For example, cast top objects must be machined in order to obtain the requisite smooth surface and subsequently polished for a specular finish. Accordingly much labor necessarily is expended to complete each such top object, and the resultant man-hour rate of production is very low. Also, cast or solid top objects are quite heavy so that metal and freight costs are high.

Moreover the slight distortion in shape of the top object, which is a concomitant of present-day inexpensive casting procedures, causes a disproportion in the entire andiron when the latter is assembled.

Another drawback of cast top object operations is the high percentage of latent defects such as air holes which are not found until machining and consequently after much time and labor have been wasted on the then useless top objects.

Pursuant to this invention, it is proposed to overcome these disadvantages by the use of sheet metal for the top objects of indirons. Sheet metal top objects need only be polished as their surfaces already are smooth enough not to require machining. Also, sheet metal top objects may be fabricated in die-working machines (e. g. presses and four slide machines) which require a comparatively small amount of a man's time in the fabrication of each object so that much time and labor are saved thereby. Sheet metal top objects are not subject to inaccuracies and defects in formation as are castings. Furthermore sheet metal top objects can be made as light as wanted. In view of all this, it is highly desirable to fabricate andiron top objects from sheet metal, and it is with a structure permitting such fabrication that this invention is concerned.

Present-day andirons usually comprise several elements held together by a tie rod. Among these elements are the top object, a column, a pair of legs and a shank. The tie rod usually is screwed into the top terminal object, extends through the column and shank, and is suitably attached to the legs. A required tapped opening in a cast or solid top object can be provided by welding a tapped bushing thereto or simply by tapping the object.

However, if the top object is made from sheet metal, the provision of a tapped opening presents difficulty. Welding of a tapped bushing to a sheet metal top object has been found to be unsatisfactory since the sheet metal is annealed by welding to such an extent that it collapses upon assembly. For the same reason brazing and soldering are unsuitable. It is obvious that the top piece itself cannot be tapped for reasons of appearance.

Nevertheless, in the trade particular importance is attached to so forming the top object of an andiron that it can threadably receive a tie rod, because this is the most convenient and practical method of assembling and disassembling an andiron.

Accordingly, it is a principal object of the present invention to produce a commercially acceptable sheet metal ornamental top terminal object for andirons.

Another object of the present invention is to provide a top terminal object of the character described which is well adapted to mass production manufacturing methods and is inexpensive to manufacture.

A further object of the present invention is to provide an easily assembled and disassembled andiron employing a top terminal object of the character described.

Yet another object of the present invention is to provide an andiron in which the top terminal object is self-centering with respect to the tie rod.

Still another object of the present invention is to provide a very rapid method of fabricating top terminal objects for andirons.

An additional object of the present invention is to provide an andiron top terminal object which is both light and strong.

Also, it is an object of the present invention to provide an andiron top terminal object which is secured in a novel fashion to the tie rod.

Other objects of this invention will in part be obvious and in part will be pointed out hereinafter.

The invention accordingly consists in the features of construction, combinations of elements, arrangements of parts, and series of steps which will be exemplified in the construction and method hereinafter described, and of which the scope of application will be indicated in the appended claims.

In the accompanying drawings, in which is shown one of the various possible embodiments of the invention, Fig. 1 is a front view of an andiron having a top object incorporating the present invention, part of the top object and column having been cut away in order better to illustrate certain interior details;

Fig. 2 is a fragmentary sectional view taken substantially along the lines 2—2 of Fig. 1;

Fig. 3 is a vertical central section through a fully fabricated top terminal object;

Fig. 4 is a view similar to Fig. 3 of a supplemental top object or spacer;

Fig. 5 is an enlarged vertical sectional view through the joint connecting the top object and spacer;

Fig. 6 is a vertical sectional view through a partially fabricated top object; and Fig. 7 is a vertical sectional view through a pair of dies used to transform the partially fabricated top object shown in Fig. 6 into the fully fabricated top object shown in Fig. 3.

Referring now in detail to the drawings, the reference numeral 10 indicates an andiron embodying my invention and including a hollow column 12 held up by a pair of legs 14, such as are shown in a copending application, Serial No. 143,766, filed February 11, 1950, now Patent No. 2,642,024, for Andiron Legs, etc. The column supports a spacer 16 on which the hollow top terminal object, for example an open-bottomed ball 18, rests. For the sake of appearance, the spacer may be shaped to continue the spherical contour of the ball.

A tie rod 20 extends through an opening in a horizontal flange 22 of the legs and through an opening in a shank 24, the bottom of the rod being provided with an abutment, e. g. a nut 26 screwed on the lower end thereof. The tie rod extends through the column and spacer into the ball.

Pursuant to the invention, a tapped member is disposed within the ball, said member being shown as a circular disc 28. This disc, which is fabricated from heavy gauge sheet metal, is of a diameter less than the major internal diameter of the ball, but greater than the diameter of the opening 30 in the bottom of the ball. The tie rod is threaded at its top and screws into the tapped opening 32 which is centrally disposed in the circular disc. Upon tensioning the tie rod 20, the ball is held against the spacer which in turn rests on the top of the column.

The ball is fabricated from heavy gauge sheet metal, e. g. 13 gauge. It first is cold worked, as by drawing, into the shape of an intermediate object 34 consisting of a hollow hemispherical portion 36 integral with a squat tubular portion 38 of the same diameter as the open side of said hemispherical portion and extending away from the same. Next, the circular disc 28 is inserted in the intermediate object 34 which then is placed in the lower die 40 shown in Fig. 7; said die cooperates with a vertically reciprocable upper die 42, the two dies having similar registered hemispherical cavities. The upper die is shown in full lines in its closed position. The unfinished object 34 is placed in the lower die when the upper die is in its raised position—shown by dotted lines in Fig. 7. The upper die then is brought down, and the upper part of the unfinished object thereby is formed under compression into the finished shape shown in Fig. 3. During this operation the tapped disc will lie below the top of the lower die and thus will not interfere with the rounding operation.

The spacer 16 may be fabricated in any suitable manner as for example by forging, casting or sheet metal operations, preferably the latter. The spacer has a flange 44 integral therewith and extending laterally inwardly to define an annular shoulder parallel to the surface on which the andiron stands when assembled. An erect sleeve 46 is integral with and perpendicular to the flange, this sleeve being of such outer diameter that it can be frictionally fitted by hand within the opening of the ball. The shoulder abuts the edge of the ball around the bottom opening and prevents the spacer from slipping into the ball.

It is apparent that the structure described above provides a top terminal object for andirons which may be fabricated from sheet metal and still be threadedly attached to a tie rod. All of the advantages of sheet metal constructions as well as the holding of the top object by screwing onto a tie rod, thus are obtained.

As long as a portion of the top object on which the tapped member is seated tapers downwardly and is of such shape that a section therethrough perpendicular to the tie rod is of a contour similar to that of the tapped member, the latter is self-centering; that is to say, the member will seek a position in which the rod is centrally disposed in the andiron. It is apparent that a ball and circular disc have these characteristics and that, therefore, said disc is self-centering.

It will thus be seen that there is provided a device and method in which the several objects of this invention are achieved, and which is well adapted to meet the conditions of practical use.

As various possible embodiments might be made of the above invention, and as various changes might be made in the embodiment and method above set forth, it is to be understood that all matter herein described or shown in the accompanying drawings is to be interpreted as illustrative and not in a limiting sense.

Having thus described my invention, I claim as new and desire to secure by Letters Patent:

1. A method of constructing a top terminal object for an andiron, said method comprising the steps of forming a hollow sheet metal object with an opening therein that is substantially as large as the maximum internal section of the object, the internal sections in said object by planes parallel to said opening being geometrically similar and progressively decreasing in size from said maximum internal section away from the opening, inserting in said hollow object through said opening a centrally tapped disc whose top and bottom surfaces are smaller than the internal section of the object in a plane parallel to said opening and immediately adjacent the maximum internal section of the object on the side of said maximum internal section nearer the opening, the shape of said disc being geometrically similar to the sections made by said planes, and reducing the opening in the hollow object to an opening that is smaller than the top and bottom surfaces of the disc while leaving the internal sections of the objects in planes immediately above and below said maximum internal section of the object larger than the top and bottom surfaces of the disc whereby the disc is held loosely captive within the object.

2. A hollow top terminal object of sheet metal for use in an andiron including a rod which is to be threaded into said object, said object being closed except for a bottom opening therein which is smaller than the maximum internal section of the object, the internal sections in said object by planes parallel to said bottom opening gradually decreasing in size in both directions away from said maximum internal section, and a centrally tapped disc within said object, said disc having a contour similar to the contour of said internal sections, the size of the top and bottom surfaces of the disc being in excess of the size of the bottom opening and being smaller than the internal sections in said objects in planes parallel to said opening and immediately above and below said maximum internal section whereby said disc is held loosely captive within the object.

3. A hollow top terminal ball of sheet metal for use in an andiron including a rod which is to be threaded into said ball, said ball being closed except for a bottom opening of lesser diameter than the major diameter of the ball, and a centrally tapped circular disc located within said ball, said disc having a diameter exceeding the diameter of the opening and less than the major diameter of the ball whereby the disc is held loosely captive within the ball.

References Cited in the file of this patent

UNITED STATES PATENTS

| 21,218 | Sargent | Aug. 17, 1858 |
| 203,551 | Mersereau | May 14, 1878 |
| 266,640 | Palmer | Oct. 31, 1882 |
| 300,081 | Janusch | June 10, 1884 |
| 378,414 | Burkhardt | Feb. 21, 1888 |
| 480,708 | Burkhardt | Aug. 16, 1892 |
| 761,508 | Kroder | May 31, 1904 |
| 955,698 | Schatz | Apr. 19, 1910 |
| 997,420 | Seng | July 11, 1911 |
| 1,081,105 | Fletcher | Dec. 9, 1913 |
| 1,688,245 | Muir | Oct. 16, 1928 |
| 2,127,982 | Northrup et al | Aug. 23, 1938 |
| 2,414,033 | Flaacke | Jan. 7, 1947 |
| 2,488,848 | Carullo et al. | Nov. 22, 1949 |

FOREIGN PATENTS

| 7,613 | Great Britain | of 1891 |
| 24,279 | Great Britain | of 1909 |